United States Patent [19]

Schweitzer et al.

[11] 4,208,580
[45] Jun. 17, 1980

[54] LITHOLOGY DETERMINATION FROM THE CALCIUM AND MAGNESIUM ACTIVATION LINES

[75] Inventors: Jeffrey S. Schweitzer, Ridgefield, Conn.; Ralph M. Tapphorn, Boulder, Colo.

[73] Assignee: Schlumberger Technology Corporation, New York, N.Y.

[21] Appl. No.: 973,244

[22] Filed: Dec. 26, 1978

[51] Int. Cl.² ............................................. G01V 5/00
[52] U.S. Cl. ................................... 250/262; 250/270
[58] Field of Search .................. 250/262, 269, 270; 324/1

[56] References Cited

U.S. PATENT DOCUMENTS

| | | | |
|---|---|---|---|
| 3,257,557 | 6/1966 | Youmans | 250/270 |
| 3,566,117 | 2/1971 | Tixier | 250/269 |
| 3,590,228 | 6/1971 | Burke | 324/1 |
| 3,662,173 | 5/1972 | Youmans | 250/270 |
| 3,665,195 | 5/1972 | Youmans | 250/270 |
| 3,781,545 | 12/1973 | Paap et al. | 250/270 |
| 3,838,279 | 9/1974 | Schultz et al. | 250/270 |
| 3,930,154 | 12/1975 | Scott | 250/270 |
| 3,943,362 | 3/1976 | Peelman | 250/270 |
| 4,020,342 | 4/1977 | Smith, Jr. et al. | 250/270 |
| 4,055,763 | 10/1977 | Antkiw | 250/270 |

OTHER PUBLICATIONS

"Log Analysis in Formations with Complex Technologies", Journal of Petroleum Technology, Aug. 1971, pp. 995–1005.

*Primary Examiner*—Davis L. Willis
*Attorney, Agent, or Firm*—Brumbaugh, Graves, Donohue and Raymond

[57] ABSTRACT

In the illustrative embodiments of the invention disclosed, the lithology of an earth formation traversed by a well bore is investigated by irradiating the formation with a neutron source and generating an energy spectrum of the activation gamma rays resulting therefrom. From the spectrum thus obtained, the levels of the activation gamma radiation emitted by $^{27}Mg$ and that emitted by $^{49}Ca$ are determined. The two intensity measurements are then combined, e.g. by forming a cross-plot or ratio thereof, to provide an indication of the lithology of the earth formation and, in particular, of the extent of dolomitization of the formation.

17 Claims, 4 Drawing Figures

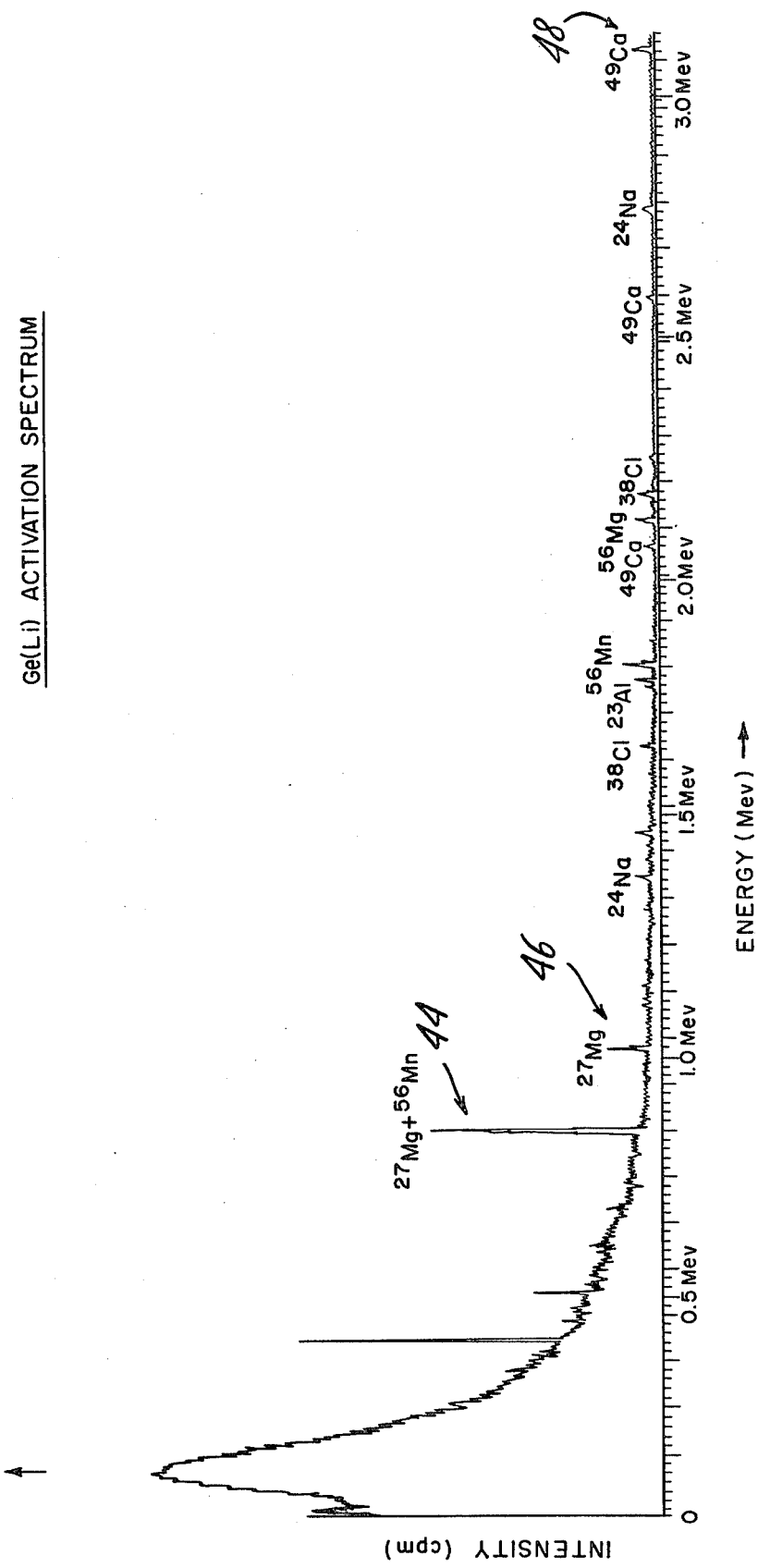

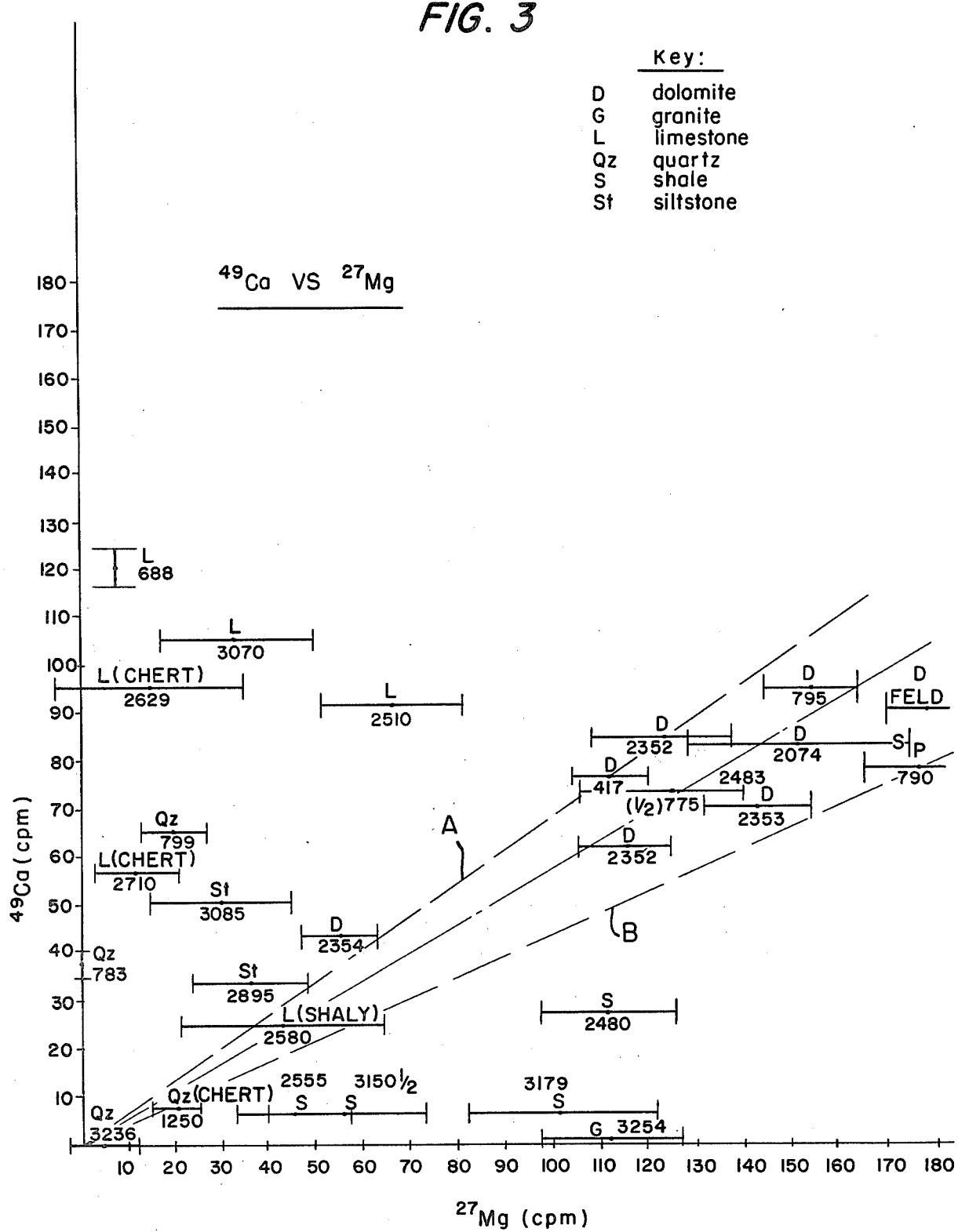

LITHOLOGY DETERMINATION FROM THE CALCIUM AND MAGNESIUM ACTIVATION LINES

BACKGROUND OF THE INVENTION

1. Field of Invention

The present invention relates in general to gamma ray spectroscopy well logging and, more particularly, to improved methods and apparatus for investigating the lithology of earth formations by neutron activation gamma ray spectroscopy.

2. The Prior Art

Heretofore, various procedures have been known for investigating the mineral composition, or lithology, of earth formations. In U.S. Pat. No. 3,566,117 to Tixier, one such technique is described in which porosity-dependent signals derived from a two-detector neutron porosity tool are cross plotted against bulk density-related signals from a two-detector gamma-gamma mudcake compensated density tool to provide an indication of lithology. Another method, described in U.S. Pat. No. 3,590,228 to Burke, combines measurements of sonic travel time, bulk density, and neutron-derived porosity to derive two lithology indices, known as M and N indices, which are then compared, e.g., by cross plotting, to identify the major lithological constituents of the formation. Several other methods are known to obtain lithology information from combinations of sonic, density, and neutron measurements. One such method, known as the Dual Mineral Method, uses a cross-plot of the neutron and density data to arrive at values of porosity and apparent matrix density of the formation. The sonic measurement is then used to indicate zones of secondary porosity and to help define the lithology. A more general method, which is based on the Dual Mineral Method, has been developed for lithology interpretations of formations having mixtures of silica, limestone, dolomite, anhydrite, and clay, or that are mixtures of any two specified minerals plus clay, and takes into account both formation shaliness and hydrocarbon effects. The above techniques are described in detail by Poupon et al. in "Log Analysis in Formations with Complex Technologies," Journal of Petroleum Technology, August, 1971, pp. 995–1005. These foregoing techniques, while generally providing an accurate indication of the formation lithology, all require data to be measured by at least two different types of logging tools.

Methods are known, however, which do not require such multiple tool data gathering operations. U.S. Pat. No. 4,055,763 to Antkiw, for example, discloses a method for using a gamma ray spectroscopy tool to identify the lithology of earth formations based on measurements of the relative proportions of selected elements in the formation. For instance, by determining the relative contributions of silicon, calcium and iron to the capture gamma ray spectrum of the formation and then forming various ratios of the measured elemental contributions, it is possible to detect the presence of shales or determine whether the formation is limestone or sandstone. A generally similar method to that of Antkiw is described in U.S. Pat. No. 3,930,154 to Scott et al, wherein, following constituent analysis of the capture gamma ray energy spectrum for a formation of unknown lithology to obtain the relative constituent proportions, the volume fractions of the various constituents are calculated and ratios of certain volume fractions are formed to provide indications of lithology, including a dolomite/limestone indicator. Although these spectroscopy techniques afford useful lithology indicators, it is desirable to provide still further information regarding the lithological make-up of formations and, in particular, to provide an improved, straightforward spectroscopy technique for differentiating between dolomite and limestone formations and for separating such formations from other lithologies. It is also desirable to provide a dolomite/limestone indicator which is not affected by the presence of sandstone in the formation.

SUMMARY OF THE INVENTION

The foregoing and other objects of the invention are attained by the provision of methods, and of apparatus for the practice thereof, for irradiating an earth formation whose lithology is to be investigated with neutrons of sufficient energy to produce the activation reactions $^{26}Mg(n,\gamma)^{27}Mg$ and $^{48}Ca(n,\gamma)^{49}Ca$, separately measuring the intensities of the gamma rays resulting from the decay of the unstable isotopes $^{27}Mg$ and $^{49}Ca$, and combining the $^{27}Mg$ and $^{49}Ca$ gamma ray measurements to provide an indication of the formation lithology. The magnesium-27 and calcium-49 measurements may be combined in a number of ways to form the lithology indicator, including, for example, the ratio functions Ca/Mg, Ca/(Ca+Mg) and Ca/(Ca+Mg+X), where X can be a constant, a quantity related to the gamma ray intensity of another emitter, such as Al, normally expected to be present in the formations, or some other value. Experiments carried out in formations of known lithology have shown that Ca/Mg ratios such as the aforementioned enable dolomites and limestones to be separated from each other and from other lithology types primarily on the basis of the ratio value alone. In situations where the ratio by itself is not sufficiently definitive, a clear indication of the lithology can usually be had by taking the absolute count rates of the $^{27}Mg$ and $^{49}Ca$ gamma ray measurements into account in conjunction with the ratio. If desired, the decay of activated $^{28}Al$ resulting from the reaction $^{27}Al(n,\gamma)^{28}Al$ may also be measured and used to develop a further lithology indicator, particularly of shale. The $^{28}Al$ measurement, or a quantity related thereto, may also be used in forming the Ca-to-Mg ratio function, as aforementioned.

BRIEF DESCRIPTION OF THE DRAWINGS

Further objects and advantages of the invention will be apparent, and a better understanding of the invention will be gained from the following description of the preferred embodiments, taken in conjunction with the accompanying drawings, in which:

FIG. 2 is a graphical representation illustrating a typical Ge(Li) activation gamma ray energy spectrum of an earth formation irradiated with neutrons from a californium-252 source;

FIG. 3 is a typical cross-plot of the activation gamma ray activities of calcium-49 versus magnesium 27, for indicating the lithology of the formation in accordance with the invention.

DETAILED DESCRIPTION

Figures 1, 4:
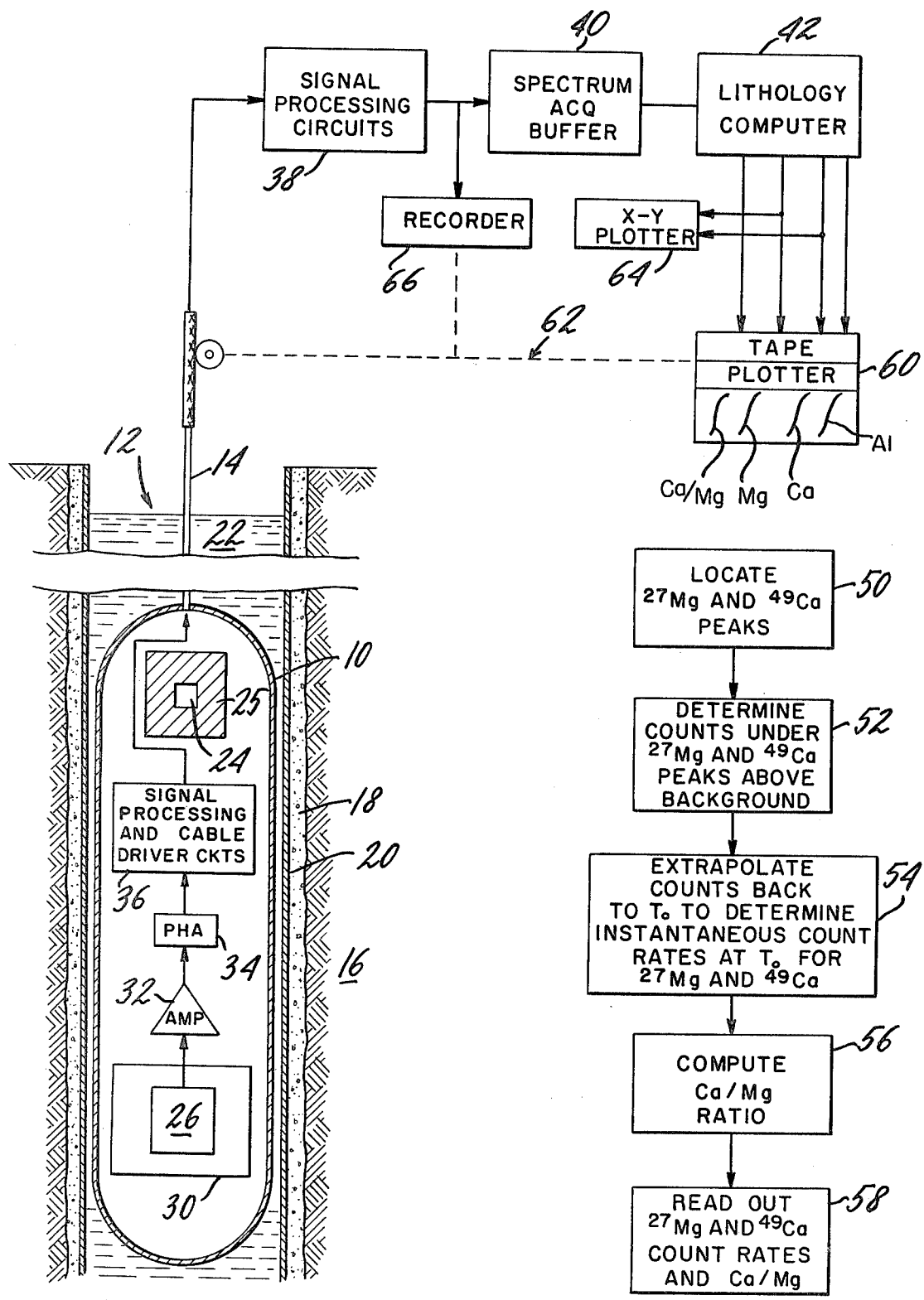
FIG. 1 is a schematic view of an embodiment of logging apparatus constructed in accordance with the invention.
FIG. 4 shows a flow diagram for carrying out analysis of an activation gamma ray spectrum to identify the calcium-49 and magnesium-27 contributions and thereafter for determining an indicator of lithology therefrom.

Referring now to the drawings and in particular to FIG. 1, a representative embodiment of the invention includes a fluid tight, pressure and temperature resistant well tool or sonde 10 that is adapted to be suspended in a well bore 12 by an armoured cable 14 for investigating a sub-surface earth formation 16. The well bore 12 is illustrated as cased, including the usual annulus of cement 18 and steel casing 20, and as containing a well fluid 22. Although no tubing is shown in the well bore, the tool if desired may be sized for through-tubing use. It will be understood that the invention has application also to open hole logging.

The sonde 10 includes a neutron source 24 and a gamma ray detector 26. The neutron source 24 may comprise either a chemical source as shown, such as californium-252, plutonium-beryllium or americium-beryllium, in which case it is suitably encapsulated in a shield 25, or a pulsed neutron generator, such as that described and illustrated in U.S. Pat. No. 2,991,364 to Goodman. For the purpose of the present invention, a californium-252 source is employed since the majority of the neutrons emitted thereby have energies below the activation threshold level of silicon-28, thereby avoiding possible contamination of the $^{27}Al(n,\gamma)^{28}Al$ activity with the $^{28}Si(n,p)^{28}Al$ activity. Higher energy sources could of course be used if such contamination is not a problem or if higher neutron yields are desired.

Where a continuous neutron source is used, the source 24 is preferably spaced sufficiently far from the detector 26 that initial gamma ray activity resulting from inelastic scattering and thermal capture reactions will have substantially dissipated by the time the detector reaches the irradiation site. The source-detector spacing should also be large enough to avoid damage to the detector due to direct neutron irradiation and to minimize activation of the detector and adjacent tool components. A suitable spacing, therefore, for a chemical source and a germanium spectrometer might be on the order of 20 feet. Where a pulsed source is used, the source 24 may be located much closer to the detector 26. In this case, the activity resulting from inelastic scattering and thermal capture reactions may be eliminated from the activation spectral data by appropriate time gating circuits. Appropriate shielding may be provided to minimize detector damage and activation.

The gamma ray dtector 26 may be of any suitable type having sufficient resolution to identify desired energy peaks (no worse than 10 keV and preferably 3 KeV or better at $E\gamma \lesssim 1$ Mev), and preferably is a high resolution, solid state detector such as a high purity germanium (HPGe) detector or a lithium-drifted germanium (Ge(Li)) detector. As such detectors operate reliably only at cryogenic temperatures, the detector 26 is encased in a cryostat 30. Although any suitable cryostat may be used, the cryostat disclosed in the copending, commonly-owned U.S. application Ser. No. 838,886, filed Oct. 3, 1977 by Ralph M. Tapphorn, co-applicant herein, is preferred for this purpose. The Tapphorn cryostat is capable of holding the detector at approximately $-180°$ C. for upwards of 15 hours.

Electrical power for the sonde 10 is supplied through the cable 14 from a source of power (not shown) at the surface. Suitable power sources (not shown) are also included in the sonde 10 for driving the detector 26 and other downhole electronics, including the neutron source 24 when a pulsed source is used.

After an earth formation has been irradiated with the neutron source 24 for a specified period of time, the sonde 10 is raised until the detector 26 is moved into position adjacent the irradiated formation, whereupon it detects gamma ray emissions resulting from the irradiation. It will be understood that logging may be either continuous or point-by-point. The time required to position the detector opposite the irradiated site (approximately 30 seconds for a 20 foot source-detector spacing) provides a time delay during which inelastic scattering gamma rays and thermal neutron capture gamma rays may dissipate prior to the initiation of the measurement period. It also affords time information between the end of the irradiation period and the beginning of the measurement period which is useful in identifying emitters and in separating interfering activity lines by half-life analysis. As will be appreciated, some measure of control over the length of this time delay may be had by varying one or both of the source-detector spacing and the speed of movement of the sonde 10. A further advantage of taking the spectra by irradiating the formation at a point spaced well from the detector and thereafter moving the detector opposite the irradiation point is that the movement of the sonde through the source-detector distance tends to displace the activated well fluid along the well bore, thereby reducing the level of unwanted borehole gamma ray activity detected.

Following amplification in amplifier 32, the output pulses from the detector 26 are applied to a pulse height analyzer (PHA) 34, which may be of any conventional type such as a single ramp (Wilkinson rundown) type. It may comprise a multi-channel device, as shown in FIG. 1 for use in generating an energy spectrum such as that shown in FIG. 2, or it may comprise a plurality of single-channel analyzers that are set to detect only the energy ranges of interest. The PHA 34 will be understood to include the usual pulse height discriminators for selection of the gamma ray energy range to be analyzed, and, where a pulsed neutron source is employed, time gating circuits for control of the time portion of the detector signal train to be analyzed.

The PHA 36 segregates the detector pulses into predetermined channels according to their amplitude and supplies signals in suitable digital form representing the amplitude of each analyzed pulse. The channel width should be no wider than the resolution of the detector, and preferably less, e.g. on the order of 1 keV per channel for a Ge(Li) activation gamma ray spectrum. Hence for a typical activation gamma ray spectrum spanning say 4.0 Mev, a 4,000 channel analyzer is preferred.

The digital output signals of the PHA 34 are delivered to downhole signal processing and cable driver circuits 36 where the data is temporarily stored and then transmitted to signal processing and cable interface circuits 38 at the surface. The signal processing and cable driver/interface circuits 36 and 38 may be of any suitable known construction for encoding and decoding, multiplexing and demultiplexing, amplifying and otherwise processing the signals for transmission to and reception at the surface, and the details thereof do not comprise a part of the present invention. Advantageously, however, the data telemetering system described in the copending, commonly-owned U.S. patent application Ser. No. 872,504, filed Jan. 26, 1978 by Belaigues et al. is employed. Alternatively, the circuits described in U.S. Pat. No. 4,012,712 to William B. Nelligan may be used.

At the surface, the activation gamma ray spectra are acquired by a data acquisition buffer 40, which accumulates the counts-per-channel signals for a period long enough to give a statistically satisfactory spectrum, but preferably in time segments short enough to allow for a half-life analysis where needed to differentiate between interfering lines or to otherwise identify emitters. For example, the spectra may be acquired in intervals of 1 minute, 5 minutes, etc., and then summed for the peaks of interest over the entire counting period if greater statistical certainty is required. Due allowance must of course be given in summing the spectra for decay of the peaks over the counting period.

Following accumulation in the acquisition buffer 40, the activation spectrum is transferred to storage buffers (not shown) in a lithology computer 42, and the acquisition buffer 40 is reset to zero. Both the acquisition buffer and the storage buffers are conventional and need not be described here. The computer may comprise a general purpose digital computer, such as the PDP-11 manufactured by the Digital Equipment Corporation, Maynard, Massachusetts, or, alternatively, it may comprise an analog computer. In either case, the computer 42 is suitably programmed or constructed, as illustrated and described hereinafter in connection with FIG. 4, to identify the energy peaks of interest, determine the net count rate under those peaks, and thereafter normalize and correct the raw count rate date for use in developing lithology information in accordance with the invention.

A typical activation spectrum obtained using a californium-252 source and a high resolution Ge(Li) detector is shown in FIG. 2. The earth formation irradiated was a dolomite composition, and after irradiation for 30 minutes, data was accumulated in contiguous time periods for a total counting time of one hour. These data were then summed to produce the FIG. 2 spectrum. In accordance with the invention, the gamma ray activities produced as a result of the magnesium activation reaction $^{26}Mg(n,\gamma)^{27}Mg$ and the calcium activation reaction $^{48}Ca(n,\gamma)^{49}Ca$ are to be measured and then combined to provide an indication of formation lithology. As an aid in developing the aforementioned lithology indicator, and/or to provide still further lithological information, the gamma ray activity due to the aluminum activation reaction $^{27}Al(n,\gamma)$ $^{28}Al$ is also preferably measured.

As the peaks for $^{27}Mg$ and $^{56}Mn$, indicated jointly at 44 on FIG. 2, are very close in energy (843.8 keV and 846.6 keV, respectively) they appear on FIG. 2 as coincident even with a high resolution Ge(li) detector. The portion of the activity attributable to each element may be determined either by comparing a later measurement and performing a half-life analysis, or by determining statistically what the expected magnesium contribution is at 843.8 keV based upon its known relation to the clean $^{27}Mg$ activity peak at 1.014 Mev, indicated at 46 on FIG. 2. The $^{49}Ca$ line is clearly seen at 48 (3.084 Mev) free of any contaminant activity.

In determining the activity under each peak, the computer 42 is first instructed at 50 (see FIG. 4) to locate the $^{27}Mg$ and $^{49}Ca$ peaks 44 and 48, and if desired the $Al^{28}$ peak, and then, at 52, to determine the area (or number of counts) thereunder above background. This may be done in a number of known ways, and various programs are available from computer software and/or hardware suppliers for such purpose. The raw intensity data is then normalized and corrected to more accurately reflect the elemental concentrations in the formation. As indicated in FIG. 4 in box 54, this may be done by extrapolating all activity back to the time when irradiation of the formation ceased, time zero ($T_o$), to determine the initial activity of each element. Alternatively, the total activity from time zero until infinity may be the basis for normalization. This accounts for the different half-lives of the elements and the time delays in taking the measurements. In addition to normalizing for the time after irradiation when measurements are taken, if the radiation time itself is changed during logging such differences must also be taken into account in the normalization step. Once the instantaneous count rates at $T_o$ for the elements have been determined, the computer 42, under instruction at 56, then combines the count rate measurements to provide an indication of lithology. The nature of the combination and of the importance of the lithological information to be derived therefrom may be appreciated upon consideration of FIG. 3.

FIG. 3 represents a cross-plot of the instantaneous count rates at $T_o$ for $^{27}Mg$ and $^{49}Ca$ as measured at various borehole depths, some, such as the dolomite point at 2,352 feet and the limestone point at 3,070 feet for example, in relatively pure lithologies and some, such as the shaly limestone at 2,580 feet, for example, in mixed lithologies. The depth of measurement is indicated numerically in feet under each measurement and the lithology is indicated by a letter symbol (D, L, S, etc.) above each measurement. The error bars |—| indicate the statistical uncertainty of the measurements. Examination of FIG. 3 reveals that substantially all of the points for the fully dolomitized formations (D) fall within a well defined region of Ca/Mg count rate ratios shown bracketed by the ratio lines A and B. (Fully dolomitized limestones have approximately equal concentrations of calcium and magnesium.) The ratio lines rather than a particular count rate region is appropriate since inaccurracy in tool positioning may affect the absolute count rate but will not affect the Ca/Mg ratios correspondingly. Similarly, limestones (L) show a much larger relative contribution of Ca than Mg and are grouped in the upper left of the plot. The shale (S) formations fall below the dolomite lines A and B, reflecting a higher Mg to Ca ratio than the dolomites. The siltstones (St), while lower than both the limestones and dolomites in both Ca and Mg intensities, appear to have a Ca/Mg ratio between the two. Likewise, the quartz (Qz) regions have Ca and Mg intensities which appear to tend to even lower absolute intensities than the siltstones.

Since the separation between the average Ca/Mg ratios for the different lithologies is quite distinct (note, for example, the wide separations between the limestone point at 3,070 feet, the dolomite point at 2,483, and the shale point at 2,555 feet) and the dispersion of the ratios about the individual averages is comparatively small (note the close grouping of the limestone points, the dolomite points and the shale points), the likelihood of confusion in lithology interpretation based on the Ca/Mg ratio alone is minimal. Hence not only does the Ca/Mg ratio indicate the degree of dolomitization of a formation (Ca/Mg→1 with increasing dolomitization), but it also enables dolomites and limestones to be separated from other lithologies. To the extent that the Ca/Mg ratio alone is not sufficiently definitive, any confusion can be almost completely eliminated by including the Mg and Ca intensities or the sum thereof in the lithology evaluation. Thus, for example, if the siltstone point at 2,895 feet might be interpreted on the basis of the Ca/Mg ratio alone as a dolomite, because of its nearness to the dolomite line region A-B, consideration of the absolute Ca and Mg count rates shows that it is instead generally too low in both count rates to be a dolomite and that it falls instead within the siltstone region.

Ratio functions other than simply Ca/Mg may also be used to obtain the lithology information. One alternative ratio is Ca/(Mg+Ca). This avoids the anomaly which results with the Ca/Mg ratio when there is a very small amount (or no) magnesium present as in relatively pure limestone. The Ca/(Mg+Ca) ratio in this case, on the other hand, will generally remain between 0, indicating shale or quartz, and 1, indicating limestone, with a value of approximately 0.5 representing dolomite regions.

Alternatively, the indicator function may take the form Ca/(Mg+Ca+aX), where X is the activation gamma ray count at $T_o$ of an element, such as aluminum-28, normally present in small amounts in both limestones and dolomites and a is a coefficient selected to provide the desired contribution of the element X to the ratio function. This form of ratio is advantageous in formations, such as quartz, where the measured activities of both magnesium and calcium approach or equal zero, and where the denominator and/or numerator of the aforementioned ratio functions may approach zero. For such cases, the resulting ratio would be meaningless. Elements other than aluminum normally present in earth formations may of course be used. Also, a constant could be substituted for the quantity aX in lieu of an elemental gamma ray intensity. If desired, the computer 42 may be programmed to use this latter ratio function only under certain conditions, e.g., when both the calcium and magnesium count rates are below predetermined levels.

Measurement of the $^{28}$Al activation activity is also useful as an independent indication of lithology and particularly of the presence of shale. In this case, it is desirable to avoid contamination of the $^{28}$Al activation line with the $^{28}$Si $(n,p)^{28}$Al line. Preferably, therefore, where aluminum activation is to be measured as a lithology indicator, a low energy neutron source, such as Cf-252, may be used to avoid production of the $^{28}$Si$(n,p)^{28}$Al reaction. Where a source of high energy neutrons is used, e.g. a minitron, the problem of contamination of the $^{28}$Al activation line with $^{28}$Si$(n,p)^{28}$Al line may be resolved by the employment of either the $^{40}$K line as a shale indicator or the $^{29}$Al line as a sand indicator.

Whichever Ca-to-Mg ratio function is used, the computer 42, after performing the normalization step indicated at box 54 in FIG. 4, computes the desired ratio, e.g., the Ca/Mg ratio as indicated at 56 in FIG. 4, from the $^{27}$Mg and $^{49}$Ca counts rates at $T_o$, and then, as shown at 58 in FIG. 4, reads out the ratio value and the instantaneous counts rates for for both elements. As shown in FIG. 1, these values are applied to a recorder 60 for display. The recorder 60 is conventional, and includes the necessary components for making either, or both, of a visual plot or a magnetic record of the measured count rate and ratio values as a function of tool depth. The usual cable-following linkage, indicated diagrammatically at 62, is provided for this purpose. If desired the $^{27}$Mg and $^{49}$Ca outputs from the computer 42 may be applied to an X-Y plotter 64 to generate a cross plot of the type depicted in FIG. 3. Such X-Y plotters are conventional and are available, for example, from California Computer Products.

Although the computer 42 is depicted in FIG. 1 as being located at the well site, it may if desired be located remotely and operated on recorded representations of the counts-per-channel data transmitted over the cable 14. To that end, the output signals from the signal processing and cable interface circuits 38 may be recorded directly as a function of depth on a tape recorder or mass storage disk 66 as shown in FIG. 1. Such recorded data could be processed by the computer to provide the count rate and ratio outputs or, alternatively, could be used to drive an X-Y plotter, as aforementioned.

Where time information is required in order to resolve interfering spectral lines, such as the $^{27}$Mg and $^{56}$Mn lines in FIG. 2, for example, multiple spectra may be taken at each depth using the single detector tool of FIG. 1, or, alternatively, a tool having two differently-spaced detectors may be moved continuously past the point of radiation and thus provide spectra at two different times. The spacings of the detectors from the source would be selected to provide the desired time information.

As mentioned above, a pulsed neutron source may be used in place of the continuous source. Whereas with a continuous source a combination of the source-detector spacing and/or the logging speed are used to gate or screen out radiation resulting from inelastic scattering and thermal capture reaction, with a pulsed source the detector and source may be placed closer together, separated by a suitable neutron barrier. Since the source may be turned on and off, radiation resulting from activation may be isolated, and the length of the data sampling controlled, by appropriate time gating circuits. This gating may be done either in the logging tool or uphole. The advantage in placing the source near the detector is in being able to detect elements having very short half lives, e.g. on the order of one second or less, where it would not be possible to move a tool having any significant source-detector spacing into place fast enough to detect these elements.

Although the invention has been illustrated and described herein with reference to specified embodiments thereof, it will be understood that such embodiments are susceptible of modification and variation without departing from the inventive concepts embodied therein. For example, instead of using a multichannel analyzer and programmed digital computer to measure the $^{27}$Mg and $^{49}$Ca count rates, the measurements could be made using a pair of single-channel analyzers and associated count rate meters, and the ratio could be formed in a ratio taking circuit. Circuits for carrying out these steps are well known and readily available in the marketplace. All such modifications and variations, therefore, are intended to be encompassed within the spirit and scope of the appended claims.

We claim:

1. A method for investigating the lithology of an earth formation traversed by a well bore, comprising the steps of:

(a) irradiating an earth formation with neutrons of sufficient energy to produce therein the neutron activation reactions $^{26}$Mg$(n,\gamma)$ $^{27}$Mg and $^{48}$Ca$(n,\gamma)$ $^{49}$Ca;

(b) measuring the level of gamma ray activity resulting from the decay of $^{27}$Mg using a high resolution gamma ray detector;
(c) measuring the level of gamma ray activity resulting from the decay of $^{49}$Ca using a high resolution gamma ray detector; and
(d) combining said $^{27}$Mg gamma ray measurement and said $^{49}$Ca gamma ray measurement to provide an indication of the lithology of the earth formation.

2. The method of claim 1 wherein the combining step comprises forming a ratio function of the $^{27}$Mg gamma ray measurement and the $^{49}$Ca gamma ray measurement, the value of said function providing an indication of the formation lithology.

3. The method of claim 2 further comprising the step of recording the $^{27}$Mg and $^{49}$Ca gamma ray measurements and the value of said ratio function as a function of tool depth.

4. The method of claim 2 wherein the numerator of said ratio function comprises one of said $^{27}$Mg and $^{49}$Ca gamma ray measurements and the denominator thereof comprises the sum of said $^{27}$Mg and $^{49}$Ca gamma ray measurements.

5. The method of claim 2 wherein the numerator of said ratio function comprises one of said $^{27}$Mg and $^{49}$Ca gamma ray measurements and the denominator thereof comprises the sum of said $^{27}$Mg and $^{49}$Ca gamma ray measurements plus another quantity.

6. The method of claim 5, further comprising the step of measuring the level of gamma ray activity resulting from the decay of an unstable isotope of Al, and wherein said another quantity is proportional to said Al gamma ray measurement.

7. A method for investigating the lithology of an earth formation traversed by a well bore, comprising the steps of:
(a) providing representations in the form of signals of the gamma ray activity resulting from the decay of $^{27}$Mg following the activation thereof by neutron irradiation;
(b) providing representations in the form of signals of the gamma ray activity resulting from the decay of $^{49}$Ca following the activation thereof by neutron irradiation;
(c) deriving separate measurements of the levels of said $^{27}$Mg and said $^{49}$Ca gamma ray activities from said respective representations; and
(d) combining said $^{27}$Mg gamma ray measurement and said $^{49}$Ca gamma ray measurement to provide an indication of the lithology of the earth formation.

8. The method of claim 7 wherein the combining step comprises forming a ratio function of the $^{27}$Mg gamma ray measurement and the $^{49}$Ca gamma ray measurement, the value of said function providing an indication of the formation lithology.

9. The method of claim 8 wherein the numerator of said ratio function comprises one of said $^{27}$Mg and $^{49}$Ca gamma ray measurements and the denominator thereof comprises the sum of said $^{27}$Mg and $^{49}$Ca gamma ray measurements.

10. The method of claim 8 wherein the numerator of said ratio function comprises one of said $^{27}$Mg and $^{49}$Ca gamma ray measurements and the denominator thereof commprises the sum of said $^{27}$Mg and $^{49}$Ca gamma ray measurements plus another quantity.

11. The method of claim 10 further comprising the steps of:
providing representations in the form of signals of the level of gamma ray activity resulting from the decay of an unstable isotope for Al following the neutron irradiation thereof;
deriving a measurement of the level of said Al gamma ray activity; and
wherein said another quantity is proportional to said Al gamma ray measurement.

12. Apparatus for investigating the lithology of an earth formation traversed by a well bore comprising:
(a) means for irradiating an earth formation with neutrons of sufficient energy to produce therein the neutron activation reactions $^{26}$Mg(n,$\gamma$)$^{27}$Mg and $^{48}$Ca(n,$\gamma$)$^{49}$Ca;
(b) high resolution gamma ray detector means for detecting gamma rays resulting from the decay of unstable isotopes of the formation;
(c) means coupled to said detector means for separately measuring the level of gamma ray activity resulting from the decay of $^{27}$Mg and the level of gamma ray activity resulting from the decay of $^{49}$Ca; and
(d) means for combining the $^{27}$Mg gamma ray measurement and the $^{49}$Ca gamma ray measurement to provide an indication of the lithology of the earth formation.

13. The apparatus of claim 12 wherein said combining means includes means for forming a ratio function of the $^{27}$Mg gamma ray measurement and the $^{49}$Ca gamma ray measurement, the value of said function providing an indication of formation lithology.

14. The apparatus of claim 13 further comprising means for recording the $^{27}$Mg and $^{49}$Ca gamma ray measurements and the value of said ratio function as a function of tool depth.

15. The apparatus of claim 13 wherein said combining means includes:
means for forming the sum of said $^{27}$Mg gamma ray measurement and said $^{49}$Ca gamma ray measurement; and
said ratio function forming means is operative to form said ratio function with one of said $^{27}$Mg and $^{49}$Ca gamma ray measurements as the numerator thereof and the sum of said $^{27}$Mg and $^{49}$Ca gamma ray measurements as the denominator thereof.

16. The apparatus of claim 13 wherein:
said combining means includes means for forming the sum of said $^{27}$Mg and $^{49}$Ca gamma ray measurements plus another quantity; and
said ratio function forming means is operative to form said ratio function with one of said $^{27}$Mg and $^{49}$Ca gamma ray measurements as the numerator thereof and the sum of said $^{27}$Mg and $^{49}$Ca gamma ray measurements and said another quantity as the denominator thereof.

17. The apparatus of claim 16 further comprising means coupled to said detector means for measuring the level of gamma ray activity resulting from the decay of an unstable isotope of Al, and wherein said another quantity is proportional to said Al gamma ray measurement.

* * * * *

UNITED STATES PATENT AND TRADEMARK OFFICE
CERTIFICATE OF CORRECTION

PATENT NO. : 4,208,580
DATED : June 17, 1980
INVENTOR(S) : Jeffrey S. Schweitzer & Ralph M. Tapphorn It is certified that error appears in the above-identified patent and that said Letters Patent are hereby corrected as shown below:

Column 10, line 7, "for Al" should read -- of Al --.

Signed and Sealed this

Ninth Day of September 1980

[SEAL]

Attest:

SIDNEY A. DIAMOND

Attesting Officer

Commissioner of Patents and Trademarks